United States Patent [19]
Youngs

[11] Patent Number: 5,431,457
[45] Date of Patent: Jul. 11, 1995

[54] FLEXIBLE ENTRY BOOT

[75] Inventor: Andrew Youngs, Granger, Ind.

[73] Assignee: Advanced Polymer Technology, Inc., Elkhart, Ind.

[21] Appl. No.: 146,597

[22] Filed: Nov. 1, 1993

[51] Int. Cl.⁶ .............................................. F16L 41/06
[52] U.S. Cl. ................................... 285/158; 285/236; 285/205
[58] Field of Search ............... 285/205, 206, 236, 158, 285/161

[56] References Cited

U.S. PATENT DOCUMENTS

| | | | |
|---|---|---|---|
| 2,310,877 | 2/1943 | Sperry | 285/90 |
| 2,441,009 | 5/1948 | Cunningham | 285/205 |
| 2,717,792 | 9/1955 | Pelley | 288/2 |
| 2,813,692 | 11/1957 | Bremer et al. | 285/158 |
| 3,178,206 | 4/1965 | Martin et al. | 285/236 |
| 3,423,518 | 1/1969 | Weagant | 285/161 |
| 3,759,280 | 9/1973 | Swanson | 137/363 |
| 3,997,760 | 12/1976 | Salinger | 219/336 |
| 4,082,301 | 4/1978 | Salinger | 277/212 F |
| 4,249,758 | 2/1981 | Harris | 285/158 |
| 4,262,166 | 4/1981 | Raozishevsky et al. | 285/158 |
| 4,365,829 | 12/1982 | Fowler | 285/236 |
| 4,492,392 | 1/1985 | Woods et al. | 285/119 |
| 4,512,148 | 4/1985 | Jacobson | 285/158 |
| 4,775,073 | 10/1988 | Webb | 220/256 |
| 4,924,923 | 5/1990 | Boehmer et al. | 141/312 |
| 5,039,137 | 8/1991 | Cankovic et al. | 285/236 |
| 5,062,457 | 11/1991 | Timmons | 285/158 |
| 5,129,684 | 7/1992 | Lawrence et al. | 285/161 |
| 5,263,794 | 11/1993 | Webb | 405/52 |
| 5,297,896 | 3/1994 | Webb | 405/52 |

Primary Examiner—Eric K. Nicholson
Attorney, Agent, or Firm—Basile and Hanlon

[57] ABSTRACT

A flexible entry boot provides a fluid-tight fitting between a wall of a fluid containment region and a conduit passing through the wall. The flexible entry boot comprises a seal member disposed within the containment region and a screw securing plate attached to the seal member. A flexibly rigid, cylindrical hollow support sleeve has a degree of flexibility sufficient to allow for the insertion of the conduit at angles less than or equal to an angle normal to the fluid containment wall while maintaining a fluid-tight environment, the hollow sleeve having a first open end integrally attached to the seal member, the first open end having a central throughbore in fluid communication with the cylindrical hollow support sleeve, the hollow sleeve having a second open end, the first open end adapted to flexibly receive a conduit, and the second open end adapted to releasably hold the conduit in place. A mechanism is provided for releasably attaching the hollow support sleeve to the conduit. The entry boot further comprises a mechanism, extending outwardly from the containment region, for releasably attaching the seal member to the wall of the containment region.

22 Claims, 2 Drawing Sheets

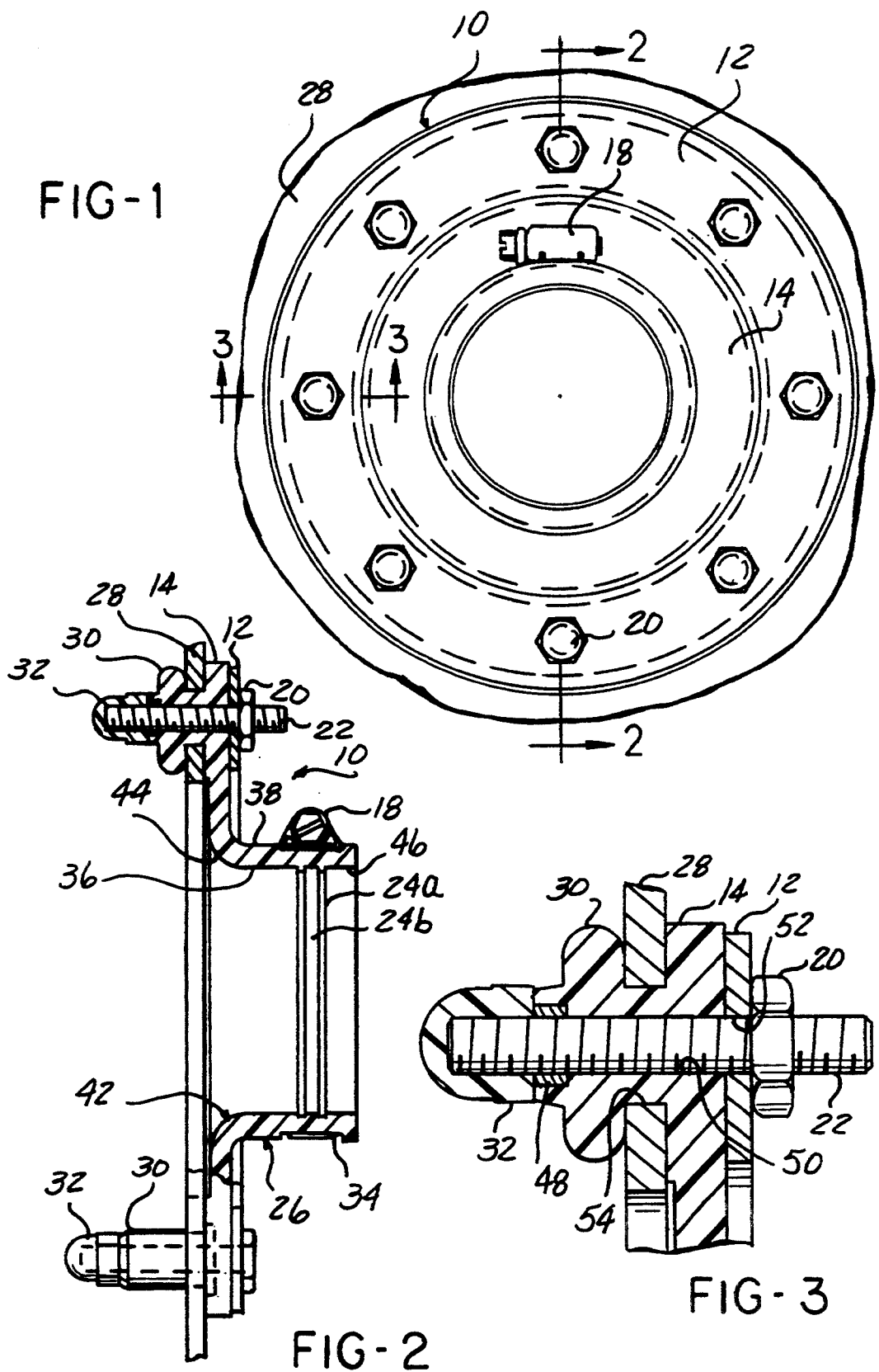

FLEXIBLE ENTRY BOOT

BACKGROUND OF THE INVENTION

The present invention relates generally to a fitting for a containment chamber and, more particularly, to a flexible entry boot for providing a fluid-tight fitting between a wall of a fluid containment region and a conduit passing through the wall.

For many years in the area of fluid fittings, some structures have been of a permanent variety which include welding or bonding of the exterior wall of the conduit to the wall opening of the fluid containment region through which the conduit extends. Other structures, such as that disclosed by Webb in U.S. Pat. No. 4,775,073, disclose the use of a fitting system which is installed at a factory and then adapted by the user to fit his needs. Such manufacturing processes of fluid containment structures are limited since they require built-in fitting systems for which all users may not have any need.

Moreover, many of these fitting structures require fixedly attaching the conduit at an angle perpendicular to the containment region wall. For example, U.S. Pat. No. 5,129,684 issued to Lawrence; U.S. Pat. No. 4,775,073 issued to Webb; U.S. Pat. No. 4,492,392 issued to Woods; and U.S. Pat. No. 2,310,877 issued to Sperry all teach conduit fitting systems which require the conduit to be placed at an angle normal to the containment wall. If the angle is not normal, the fluid-tight seal will be breached. Such requirements greatly inhibit the use of the fitting system since a conduit cannot be inserted into the containment wall at angles which are other than normal while still maintaining a fluid-tight environment.

Furthermore, many structures require the sealing member to be fully or partially disposed outside the containment region. For example, U.S. Pat. No. 5,129,684 issued to Lawrence; U.S. Pat. No. 4,924,923 issued to Boehmer; U.S. Pat. No. 4,775,073 issued to Webb; U.S. Pat. No. 4,492,392 issued to Woods; U.S. Pat. No. 4,082,301 issued to Salinger; U.S. Pat. No. 3,759,280 issued to Swanson; and U.S. Pat. No. 2,717,792 issued to Phelly disclose sealing members existing at least in part outside the containment region. Such a requirement exposes the sealing member to ground and weather exposure, which results in an eventual wearing out of the sealing member, thereby causing a breach in the fluid-tight environment.

Thus, it is an object of the present invention to provide a fluid-tight boot for use with fluid-tight fitting systems, which boot has the advantage of easy installation for a user. It is a further object of the present invention to provide such an entry boot which has a sealing member substantially fully disposed within the containment region, which advantageously protects the sealing member from ground and weather exposure. Yet still further, it is an object of the present invention to provide such an entry boot which allows for the insertion of a conduit into a containment wall opening at angles which are not necessarily normal while maintaining a fluid-tight environment. Still further, it is an object of the present invention to provide such a fluid-tight system which is of simple construction and relatively easy and inexpensive to manufacture.

SUMMARY OF THE INVENTION

The present invention addresses and solves the problems enumerated above. The present invention comprises a flexible entry boot for providing a fluid-tight fitting between a wall of a fluid containment region and a conduit passing through the wall. The flexible entry boot comprises a seal member disposed within the containment region and a screw securing plate attached to the seal member. A flexibly rigid, cylindrical hollow support sleeve has a degree of flexibility sufficient to allow for the insertion of the conduit at angles less than or equal to an angle normal to the fluid containment wall while maintaining a fluid-tight environment, the hollow sleeve having a first open end integrally attached to the seal member, the first open end having a central throughbore in fluid communication with the cylindrical hollow support sleeve, the hollow sleeve having a second open end, the first open end adapted to flexibly receive a conduit, and the second open end adapted to releasably hold the conduit in place. Means are provided for releasably attaching the hollow support sleeve to the conduit. The entry boot further comprises means, extending outwardly from the containment region, for releasably attaching the seal member to the wall of the containment region.

BRIEF DESCRIPTION OF THE DRAWINGS

Other objects, features and advantages of the present invention will become apparent by reference to the following detailed description and drawings, in which:

FIG. 1 is a front view of the flexible entry boot of the present invention, shown installed in a fluid containment wall which is broken away;

FIG. 2 is a cross-sectional view taken on line 2—2 of FIG. 1;

FIG. 3 is an enlarged cross-sectional view taken on line 3—3 of FIG. 1;

DETAILED DESCRIPTION OF THE PREFERRED EMBODIMENTS

Figure 4:
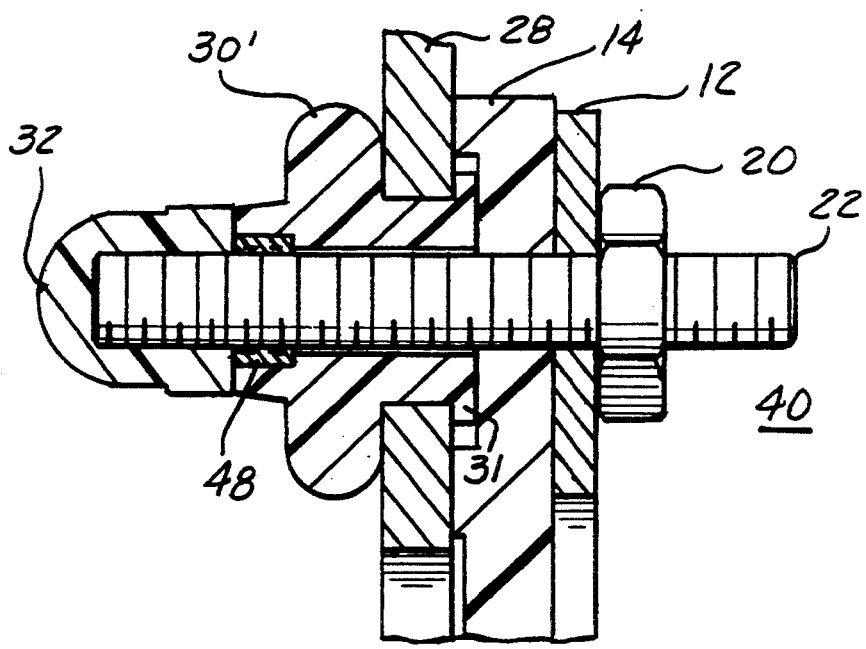
FIG. 4 is a view similar to that of FIG. 3, showing an alternate embodiment.

The present invention comprises a flexible entry boot 10 for providing a fluid-tight fitting between a wall 28 of a fluid containment region 40 and a conduit (not shown) passing through wall 28. Flexible entry boot 10 comprises a seal member 14 disposed within containment region 40. This seal member may be formed of any suitable material, depending upon the particular requirements due to the fluid contained. Preferably, the boot will be formed from an oil and gas resistant material, or any other material which will be resistant to alcohols and hydrocarbons. More preferably, the seal member 14 is comprised of nitrile rubber. Further, seal member may be of any suitable shape and size, depending upon the manufacturer and particular end use. In the preferred embodiment, the seal member is circular, as shown in FIG. 1.

Flexible entry boot 10 further comprises a screw securing plate 12 attached to seal member 14. Similarly, this screw securing plate 12 may also be of any desired size and shape and of any suitable material. In the preferred embodiment, the screw securing plate 12 is circular and is formed from a suitable metal material.

Referring now to FIG. 2, a flexibly rigid, cylindrical hollow support sleeve 26 has a degree of flexibility sufficient to allow for the insertion of the conduit at angles less than or equal to a 90° angle, i.e. the conduit does not have to be inserted precisely perpendicular to the containment wall 28 in order to maintain a fluid-tight environment, and has a degree of flexion such that if moved after fitted, the fluid-tight environment remains intact. The amount of flexion may be any suitable desired amount, however, in the preferred embodiment, the hollow sleeve provides for up to approximately a 30° offset from normal (90°) in any direction.

Hollow sleeve 26 has a first open end 42 integrally attached to seal member 14, first open end 42 having a central throughbore 44 in fluid communication with hollow support sleeve 26. Sleeve 26 has a second open end 46, with first open end 42 adapted to flexibly receive a conduit, and second open end 46 adapted to releasably hold the conduit in place. It is to be understood that hollow support sleeve 26 may be formed in any suitable shape and of any suitable material, and may provide any degree of flexion as necessitated by the particular manufacturer and end use, as long as such choices serve the objects and advantages of the present invention as set out hereinabove.

Means are provided for releasably attaching hollow support sleeve 26 to the conduit. This releasable conduit attaching means may comprise any suitable means. However, in the preferred embodiment, this conduit attaching means comprises a hose clamp 18.

Flexible entry boot 10 further comprises means, extending outwardly from containment region 40, for releasably attaching seal member 14 to wall 28 of containment region 40. Again, it is to be understood that this seal member attaching means may comprise any suitable means, however, in the preferred embodiment, this attaching means comprises a plurality of screw and nut assemblies as best seen in FIG. 3.

The screw and nut assemblies may be any conventionally known assemblies, and further, any known and suitable fastening means may be used. In the preferred embodiment, the screw and nut assemblies include a screw cap 32 releasably and threadably attached to an end of each screw 22. The seal member-to-containment wall attachment means may further comprise a plurality of flanged neoprene bushings 30 disposed between each nut 20 and screw cap 32. As can clearly be seen in FIG. 3, nut 20 is attached at a screw end opposite the end at which screw cap 32 is attached. As shown in the preferred embodiment in FIG. 3, the flanged neoprene bushing 30 has a second nut 48 integrally disposed therein and is integrally formed with seal member 14. Screw caps 32 and bushings 30, in that they are exposed to the surrounding soil or other environment, are preferably formed from a suitable corrosion resistant material. In the preferred embodiment, screw caps 32 are formed from a suitable corrosion resistant nylon material.

Figure 5:
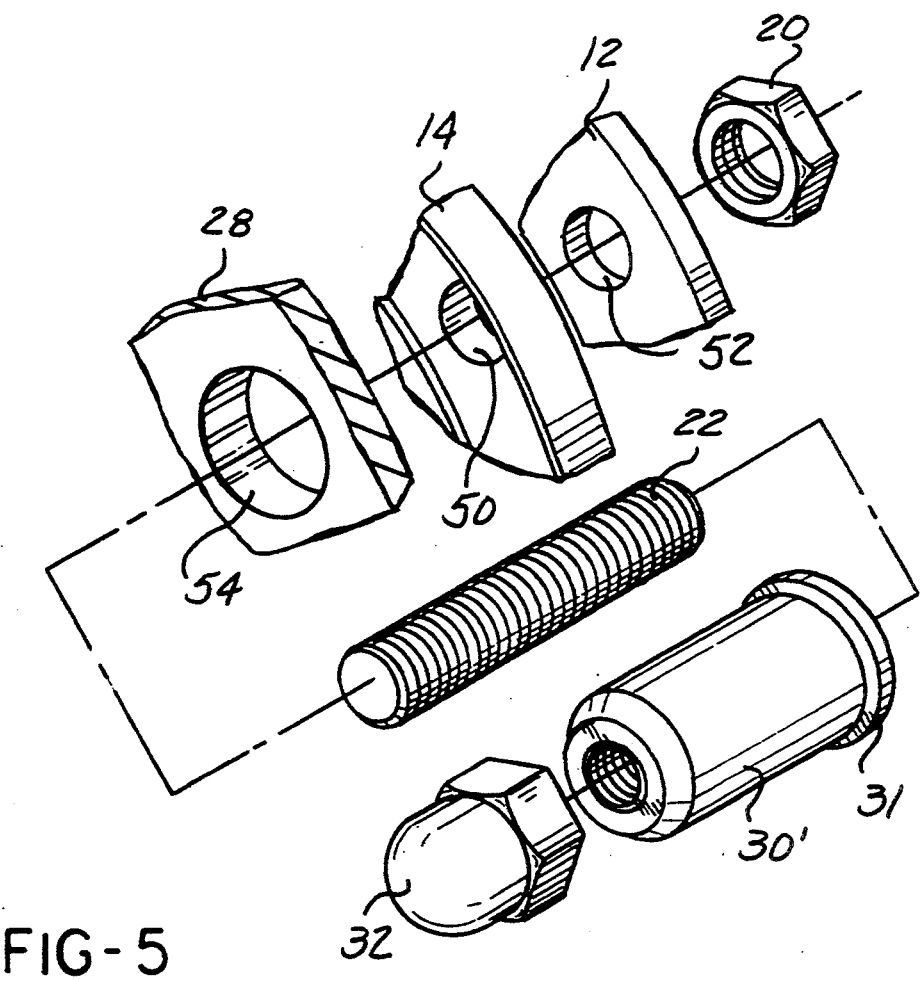
FIG. 5 is an enlarged, broken away, exploded perspective view of the alternate embodiment of the present invention.

In an alternate preferred embodiment, shown in FIGS. 4 and 5, neoprene bushing 30' is separate from seal member 14. Any such bushing 30' may be used. One such bushing is commercially available under the trademark WELL-NUT. The annular bushing flange is designated as 31.

Seal member 14 includes a plurality of bores 50 extending transversely through seal member 14 for inserting the seal member-to-containment wall attaching means. Screw securing plate 12 includes a plurality of apertures 52. Containment wall 28 also contains a plurality of bores 54. The wall bores 54, plate apertures 52 and seal bores 50 are all in corresponding relation one to the other, as most clearly shown in FIG. 5. Any size and number of seal bores 50 and plate apertures 52 may be used. However, in the preferred embodiment, the seal member bores 50 are disposed evenly around seal member 14, as best seen in FIG. 1. Similarly, the screw plate apertures 52 are disposed evenly about screw plate 12.

Hollow sleeve 26 has an outer surface 38 and an inner, conduit receiving surface 36. Hollow sleeve 26 may further comprise an annular groove 34, disposed on outer surface 38 of support sleeve 26, for receiving the support sleeve-to-conduit attaching means. As best seen in FIG. 2, this annular groove 34 is releasably receiving hose clamp 18.

Hollow support sleeve 26 may further comprise at least one gripping flange 24a disposed on the inner, conduit receiving surface. As shown in FIG. 2, a second gripping flange 24b is shown.

The flexible entry boot as described hereinabove achieves, but is not limited to, the objects and advantages described more fully above.

While preferred embodiments, forms and arrangements of parts of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A flexible entry boot for providing a fluid-tight fitting between a wall of a fluid containment region and a conduit passing through the wall, the flexible entry boot comprising:

a seal member disposed within the containment region;

a screw securing plate attached to the seal member;

a substantially rigid, cylindrical hollow support sleeve having a degree of flexibility sufficient to allow for the insertion of the conduit at angles less than or equal to an angle normal to the fluid containment wall while maintaining a fluid-tight environment, the hollow sleeve having a first open portion integrally attached to the seal member, the first open portion having a central throughbore in fluid communication with the cylindrical hollow support sleeve, the hollow sleeve having a second open portion, the first open portion adapted to flexibly receive a conduit, and the second open portion adapted to releasably hold the conduit in place;

means for releasably attaching the hollow support sleeve to the conduit; and means, extending outwardly from the containment region, for releasably attaching the seal member to the wall of the containment region, wherein the seal member-to-containment wall attachment means comprises a plurality of screw and nut assemblies, and wherein the screw and nut assemblies include a screw cap releasably attached to an end of each screw, and wherein the seal member-to-containment wall attachment means further comprises a plurality of flanged neoprene bushings disposed between each nut and screw.

2. The entry boot of claim 1, wherein the boot is made from an oil and gas resistant material.

3. The entry boot of claim 1, wherein the hollow support sleeve-to-conduit attachment means comprises a hose clamp.

4. The entry boot of claim 1, wherein the seal member includes a plurality of bores extending transversely through the seal member for inserting the seal member-to-containment wall attachment means, and wherein the screw securing plate includes a plurality of apertures, the apertures in corresponding relation to the plurality of bores.

5. The entry boot of claim 4, wherein the plurality of bores of the seal member are disposed evenly around the seal member and wherein the plurality of apertures of the screw plate are disposed evenly around the screw plate.

6. The entry boot of claim 5, wherein the seal member is circular.

7. The entry boot of claim 6, wherein the screw plate is circular.

8. The entry boot of claim 1, wherein the hollow sleeve has an outer surface and an inner, conduit receiving surface, and wherein the hollow support sleeve comprises an annular groove, disposed on the outer surface of the support sleeve, for receiving the support sleeve-to-conduit attachment means.

9. The entry boot of claim 1, wherein the hollow sleeve has an outer surface and an inner, conduit receiving surface, and wherein the hollow support sleeve includes at least one gripping flange disposed on the inner, conduit receiving surface.

10. The entry boot of claim 1, wherein the seal member is comprised of nitrile rubber.

11. A flexible entry boot made of an oil and gas resistant material for providing a fluid-tight fitting between a wall of a fluid containment region and a conduit passing through the wall, the flexible entry boot comprising:
 a circular nitrile rubber seal member disposed within the containment region, the seal member having a plurality of bores extending transversely therethrough, the bores disposed evenly around the circular seal member;
 an annular screw securing plate disposed within the containment region and attached to the circular rubber seal member, the screw securing plate having a plurality of apertures disposed evenly around the screw securing plate and in corresponding relation to the seal member bores;
 a substantially rigid, cylindrical hollow support sleeve having an outer surface and an inner, conduit receiving surface, the inner surface having a gripping flange disposed thereon and the outer surface having an annular groove disposed thereon, the hollow support sleeve further having a degree of flexibility sufficient to allow for the insertion of the conduit at angles less than or equal to an angle normal to the fluid containment wall while maintaining a fluid-tight environment, the hollow sleeve having a first open portion integrally attached to the circular rubber seal member, the first open portion having a central throughbore in fluid communication with the cylindrical hollow support sleeve, the hollow sleeve having a second open portion, the first open portion adapted to flexibly receive a conduit, and the second open portion adapted to releasably hold the conduit in place;
 a hose clamp, receivable within the annular groove, for releasably attaching the hollow support sleeve to the conduit; and
 a plurality of screw and nut assemblies having a plurality of screw caps releasably attached to an end of each screw, and further comprising a plurality of flanged neoprene bushings disposed between each screw cap and nut, the plurality of screw and nut assemblies extending outwardly from the containment region for releasably attaching the circular nitrile rubber seal member to the wall of the containment region.

12. A fluid containment system having a flexible entry boot for providing a fluid-tight fitting between a wall of a fluid containment region and a conduit passing through the wall, the flexible entry boot comprising:
 a seal member disposed within the containment region;
 a screw securing plate attached to the seal member;
 a substantially rigid, cylindrical hollow support sleeve having a degree of flexibility sufficient to allow for the insertion of the conduit at angles less than or equal to an angle normal to the fluid containment wall while maintaining a fluid-tight environment, the hollow sleeve having a first open portion integrally attached to the seal member, the first open portion having a central throughbore in fluid communication with the cylindrical hollow support sleeve, the hollow sleeve having a second open portion, the first open portion adapted to flexibly receive a conduit, and the second open portion adapted to releasably hold the conduit in place;
 means for releasably attaching the hollow support sleeve to the conduit; and
 means, extending outwardly from the containment region, for releasably attaching the seal member to the wall of the containment region, wherein the seal member-to-containment wall attachment means comprises a plurality of screw and nut assemblies, and wherein the screw and nut assemblies include a screw cap releasably attached to an end of each screw, and wherein the seal member-to-containment wall attachment means further comprises a plurality of flanged neoprene bushings disposed between each nut and screw cap.

13. The fluid containment system of claim 12, wherein the boot is made from an oil and gas resistant material.

14. The fluid containment system of claim 12, wherein the hollow support sleeve-to-conduit attachment means comprises a hose clamp.

15. The fluid containment system of claim 12, wherein the seal member includes a plurality of bores extending transversely through the seal member for inserting the seal member-to-containment wall attachment means, and wherein the screw securing plate includes a plurality of apertures, the apertures in corresponding relation to the plurality of bores.

16. The fluid containment system of claim 15, wherein the plurality of bores of the seal member are disposed evenly around the seal member and wherein the plurality of apertures of the screw plate are disposed evenly around the screw plate.

17. The fluid containment system of claim 16, wherein the seal member is circular.

18. The fluid containment system of claim 17, wherein the screw plate is circular.

19. The fluid containment system of claim 12, wherein the hollow sleeve has an outer surface and an inner, conduit receiving surface, and wherein the hollow support sleeve comprises an annular groove, disposed on the outer surface of the support sleeve, for receiving the support sleeve-to-conduit attachment means.

20. The fluid containment system of claim 12, wherein the hollow sleeve has an outer surface and an inner, conduit receiving surface, and wherein the hollow support sleeve includes at least one gripping flange disposed on the inner conduit receiving surface.

21. The fluid containment system of claim 12, wherein the seal member is comprised of nitrile rubber.

22. A fluid containment system having a flexible entry boot made of an oil and gas resistant material for providing a fluid-tight fitting between a wall of a fluid containment region and a conduit passing through the wall, the flexible entry boot comprising:
- a circular nitrile rubber seal member disposed within the containment region, the seal member having a plurality of bores extending transversely therethrough, the bores disposed evenly around the circular seal member;
- an annular screw securing plate disposed within the containment region and attached to the circular rubber seal member, the screw securing plate having a plurality of apertures disposed evenly around the screw securing plate and in corresponding relation to the seal member bores;
- a substantially rigid, cylindrical hollow support sleeve having an outer surface and an inner, conduit receiving surface, the inner surface having a gripping flange disposed thereon and the outer surface having an annular groove disposed thereon, the hollow support sleeve further having a degree of flexibility sufficient to allow for the insertion of the conduit at angles less than or equal to an angle normal to the fluid containment wall while maintaining a fluid-tight environment, the hollow sleeve having a first open portion integrally attached to the circular rubber seal member, the first open portion having a central throughbore in fluid communication with the cylindrical hollow support sleeve, the hollow sleeve having a second open portion, the first open portion adapted to flexibly receive a conduit, and the second open portion adapted to releasably hold the conduit in place;
- a hose clamp, receivable within the annular groove, for releasably attaching the hollow support sleeve to the conduit; and
- a plurality of screw and nut assemblies having a plurality of screw caps releasably attached to an end of each screw, and further comprising a plurality of flanged neoprene bushings disposed between each screw cap and nut, the plurality of screw and nut assemblies extending outwardly from the containment region for releasably attaching the circular nitrile rubber seal member to the wall of the containment region.

* * * * *

UNITED STATES PATENT AND TRADEMARK OFFICE
CERTIFICATE OF CORRECTION

PATENT NO. : 5,431,457
DATED : July 11, 1995
INVENTOR(S) : Andrew Youngs

It is certified that error appears in the above-indentified patent and that said Letters Patent is hereby corrected as shown below:

Column 4,
In Claim 1, line 66, after "screw" insert --cap--.

Signed and Sealed this

Ninth Day of January, 1996

Attest:

BRUCE LEHMAN

*Attesting Officer*  *Commissioner of Patents and Trademarks*